T. STUBBLEFIELD.
Pressure Gage.
No. 11,333.
Patented July 18, 1854.
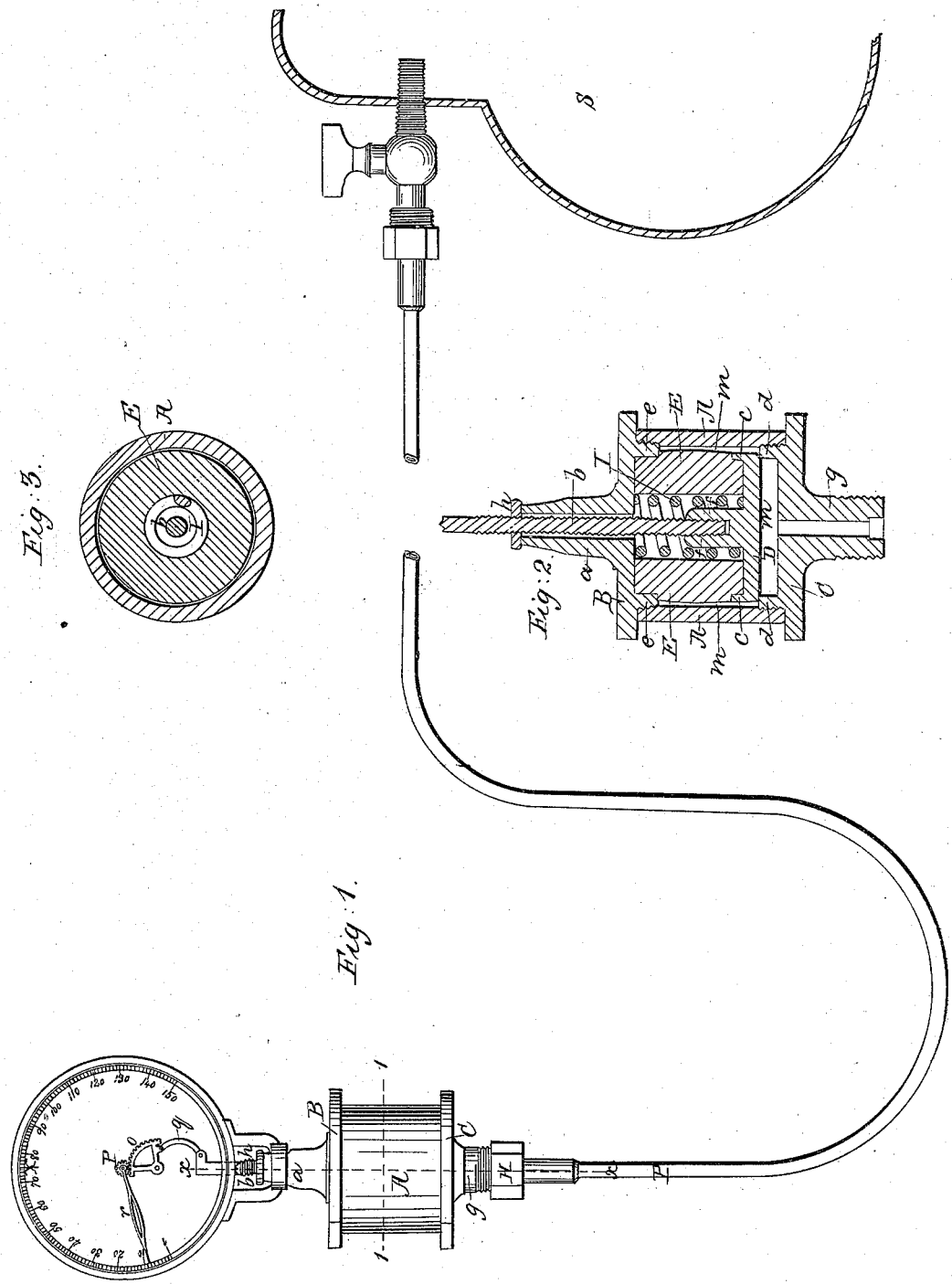

UNITED STATES PATENT OFFICE.

THOMAS STUBBLEFIELD, OF COLUMBUS, GEORGIA.

STEAM-GAGE.

Specification forming part of Letters Patent No. 11,333, dated July 18, 1854; Reissued March 15, 1859, No. 676.

*To all whom it may concern:*

Be it known that I, THOMAS STUBBLEFIELD, of Columbus, in the county of Muscogee and State of Georgia, have invented a new and useful Improvement in Gages for Indicating the Pressure of Steam and other Fluids, of which the following is a full, clear, and exact description, reference being had to the accompanying drawing of the same, which makes part of this specification, and in which—

Figure 1 represents a side elevation of one of my gages applied to a steam boiler; Fig. 2 represents a longitudinal section at the line # # of Fig. 1; and Fig. 3 represents a transverse section at the line 1, 1, of Fig. 1.

The apparatus consists of a hollow cylinder (A) fitted at one end with a cap (B) and at the other with a cap C. Each cap has a central tubular stem, projecting from its outer side, the opening in the stems extending through the caps so as to form a communication between the interior and exterior of the cylinder.

The stem ($a$) of the outer cap or head (B) of the cylinder, has a rod ($b$) passing loosely through it, which screws at its inner end, into the stem ($f$) of a disk (D) which fits loosely within the cylinder (A) in the manner of a piston but with a space of about one eighth of an inch between its periphery and the inside of the cylinder. This disk has a rim ($c$) around its edge on the side adjacent to the outer head, while its opposite side, or that adjacent to the inner head (C) rests on a rim ($d$) on the inside of this head. The stem ($f$) is of such a length that the space between it and the inside of the outer head (B) shall equal the greatest range of motion that it is designed to give the disk (D) for a purpose to be hereafter explained. The inner side of the outer head (B) has a rim ($e$) formed on it, and in the space included within this rim, one end of a short thick hollow cylinder or tube of vulcanized india-rubber (E) is placed, the other end of the rubber being placed within the rim ($c$) of the disk (D). The external diameter of the rubber is somewhat greater than the internal diameter of the rims, in order that it may fit tightly therein. Inside of the rubber I place a helix I of spring wire. I prefer hardened brass for the purpose.

The helix, rubber, and disk, being placed in the relative position shown in Fig. 2, the rod ($b$) is screwed into the disk as shown, and then a nut ($h$) is screwed upon a thread on the upper end of the rod ($b$) until by bearing on the top of the stem ($a$) the disk (D) is drawn toward the outer cap (B) with sufficient force to compress the ends of the cylinder of rubber, in contact with the inside and edge of the rims ($e$) and ($c$) so as to make a tight joint, which pressure will usually equal one pound to the square inch of the surface of the disk (D). By this arrangement the space within the helix (I) has a free communication with the atmosphere, by the opening through the stem ($a$) but is separated by the cylinder of india rubber (E) from the space between the rubber and the cylinder (A) and that between the disk (D) and head (C). Now if the stem ($g$) of the inner cap (C) be connected as shown in the drawing by a coupling (H) with a pipe (P) whose opposite end communicates with the interior of a steam boiler (S) the steam or water in the boiler will have a free communication with the space ($m$) in the cylinder, and its pressure acting upon the disk (D) will compress the india rubber and wire helix until their resistance, and the pressure of the steam are equal. From this it follows that the greater the pressure of the steam, the greater will be the compression of the rubber and helix, and the nearer will the disk (D) approach the outer cap (B). This movement of the disk (D) will give a corresponding movement to the rod ($b$) screwed into it, causing the outer end of the rod to protrude from the stem ($a$) of the cap (B); and when by the diminution of pressure in the boiler the disk (D) is pushed back by the spring, the rod ($b$) will be drawn in again. This alternate protrusion and retraction of the rod will give motion to a cogged sector ($o$) with which it is connected by a link rod ($g$). The sector gears with a pinion ($p$) on the axis of a pointer ($r$) that traverses an index (X) the divisions of which are so graduated as to indicate any pressure from one to one hundred and fifty pounds on every square inch of surface within the boiler. When the rod ($b$) is protruded the pointer is moved to higher numbers on the index, and when the rod is retracted again the pointer is moved back to lower numbers.

The helix within the cylinder of india rubber prevents the latter from collapsing by the pressure of the steam on its periphery; and this is important because if the rubber were to collapse and bind the rod (b) the friction would prevent a true indication of the pressure within the boiler. If however the pressure to be measured should be so low or the thickness of the india rubber so great that there would not be any liability to collapse, the wire helix may in such cases be omitted.

To prevent the india rubber from being affected by heat so as to alter its elasticity, I connect the gage with the boiler, by means of a long small pipe, bent like an inverted siphon, and placed in such a position that the bend and the gage also will be on a level several inches below the point at which the pipe (P) connects with the boiler, and it would in all cases be best if the lowest bend of the pipe (P) should extend below the bottom of the boiler, although its connection should be with the steam space at the top. The india rubber cylinder in this case performs the double office of manometer spring, and packing to keep the joints tight.

Having described my improved gage, what I claim therein as my invention, and desire to secure by Letters Patent is—

The combination of the hollow cylindrical box perforated at both ends, with a hollow cylinder of india rubber open at one end, and performing the duty of manometer spring as herein described, and also separating the perforations in the opposite ends of the box; the several parts being constructed and arranged, and the case connected with the boiler, and the india rubber with the index, as herein set forth.

In testimony whereof, I have hereunto subscribed my name.

THOS. STUBBLEFIELD.

Witnesses:
P. H. WATSON,
PETER HANNAY.

[FIRST PRINTED 1913.]